(12) United States Patent
Mouri et al.

(10) Patent No.: US 12,733,079 B2
(45) Date of Patent: Sep. 8, 2026

(54) LAMP CONTROL METHOD AND DEVICE FOR VEHICLE

(71) Applicant: TOYOTA JIDOSHA KABUSHIKI KAISHA, Toyota (JP)

(72) Inventors: Fumihiko Mouri, Owariasahi (JP); Kento Nakazato, Tama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/884,146

(22) Filed: Sep. 13, 2024

(65) Prior Publication Data

US 2025/0240859 A1 Jul. 24, 2025

(30) Foreign Application Priority Data

Jan. 19, 2024 (JP) ................................ 2024-007060

(51) Int. Cl.

*H05B 47/16* (2020.01)
*B60Q 1/38* (2006.01)
*H05B 47/165* (2020.01)

(52) U.S. Cl.

CPC ............ *H05B 47/16* (2020.01); *B60Q 1/381* (2022.05); *H05B 47/165* (2020.01); *B60Q 2400/20* (2013.01); *B60Q 2400/50* (2013.01)

(58) Field of Classification Search

CPC .... H05B 47/16; H05B 47/115; H05B 47/125; H05B 47/165; B60Q 1/381; B60Q 2400/20; B60Q 2400/50

See application file for complete search history.

(56) References Cited

U.S. PATENT DOCUMENTS

2017/0101147 A1 4/2017 Hasegawa
2019/0248276 A1* 8/2019 Sutou .................... B60Q 1/507
2021/0206312 A1* 7/2021 Mochizuki .............. B60Q 1/50
2021/0213868 A1* 7/2021 Sung ..................... B60Q 1/085
2021/0300412 A1* 9/2021 Dingli .............. B60W 50/0098
2022/0348139 A1* 11/2022 Roeber ................. B60Q 1/535
2023/0158947 A1 5/2023 Mouri
2024/0181957 A1* 6/2024 Mouri ..................... B60Q 1/16

FOREIGN PATENT DOCUMENTS

JP 2016-030527 A 3/2016
JP 2017-037806 A 2/2017
JP 2017-074820 A 4/2017
JP 2021-079907 A 5/2021
JP 2023-075595 A 5/2023

* cited by examiner

*Primary Examiner* — Tung X Le
(74) *Attorney, Agent, or Firm* — SoraIP, Inc.

(57) ABSTRACT

At the time of lane change of the own vehicle, a light pattern, which is a pattern in which three partial projection regions of a predetermined shape are arranged in a direction extending from the own vehicle to the lane side of the lane change destination, is projected from the lamp of the own vehicle in a direction extending from the own vehicle to the lane side of the lane change destination. Further, by reducing the number of partial projection regions of a predetermined shape included in the light pattern at the timing at which the lane change has progressed, the length of the light pattern is made shorter than the timing at which the lane change starts.

4 Claims, 5 Drawing Sheets

10
SENSOR GROUP
12
CAMERA
14
ANGULAR VELOCITY SENSOR
16
VEHICLE SPEED SENSOR
18
STEERING ANGLE SENSOR
20
TURN SIGNAL LEVER SWITCH
22
SENSOR CONTROL DEVICE
24
DRIVING OPERATION INFORMATION RECORDING DEVICE
26
LANE CHANGE STEERING ASSIST FUNCTION UNIT
28
NAVIGATION SYSTEM
27
LAMP LIGHTING CONTROL DEVICE
30
LAMP UNIT
32

FIG. 2A
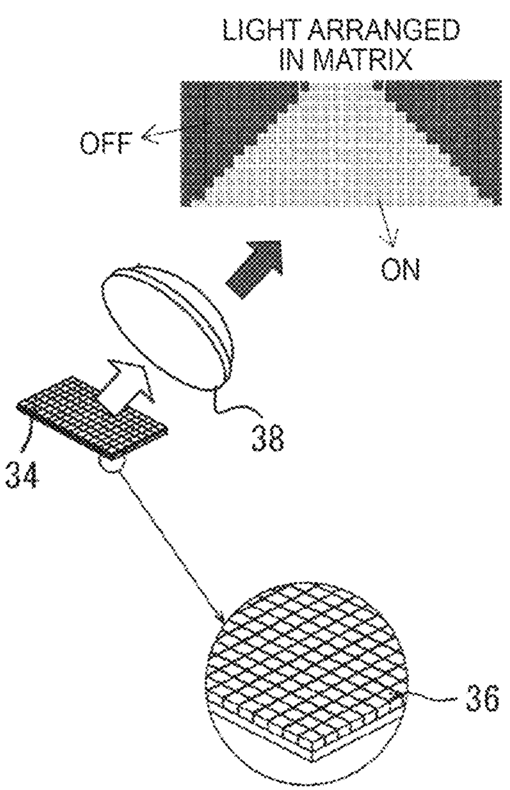
FIG. 2B
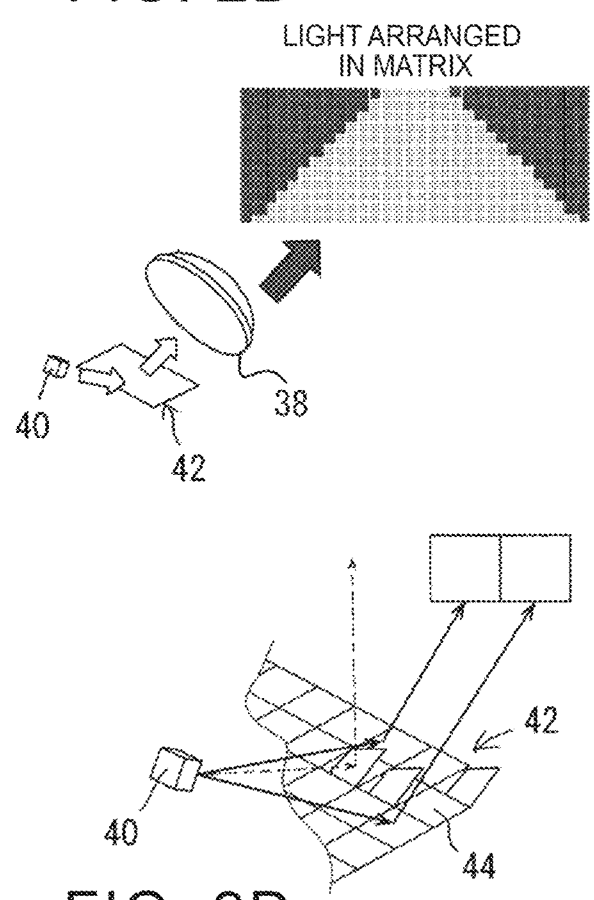
FIG. 2C
SCANNING LASER BEAM
38
46
50
48
50
46
48
FIG. 2D
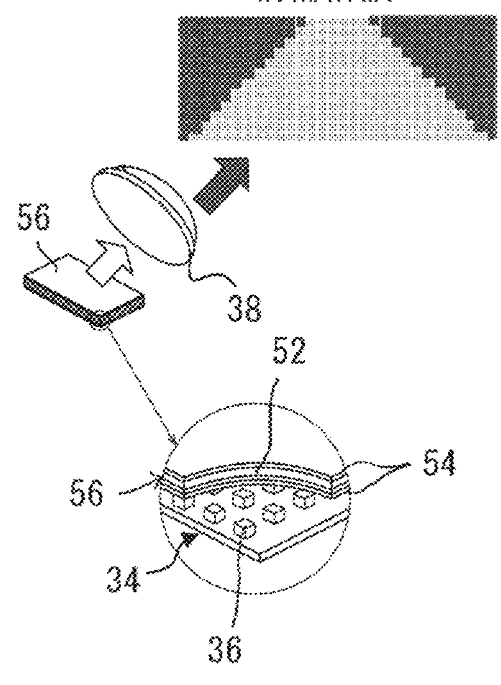

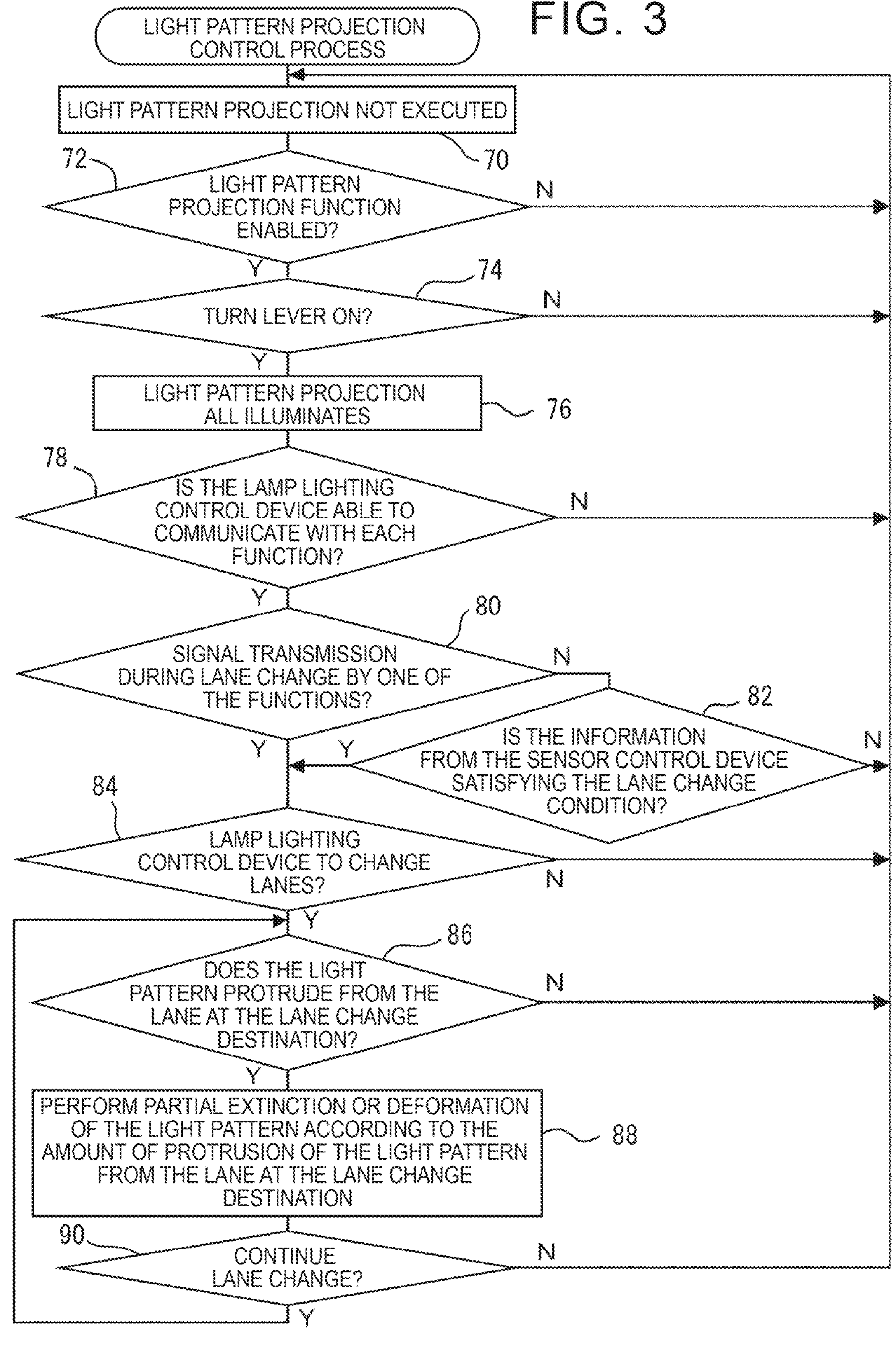
FIG. 3
LIGHT PATTERN PROJECTION CONTROL PROCESS
LIGHT PATTERN PROJECTION NOT EXECUTED
70
72
LIGHT PATTERN PROJECTION FUNCTION ENABLED?
N
Y
74
TURN LEVER ON?
N
Y
LIGHT PATTERN PROJECTION ALL ILLUMINATES
76
78
IS THE LAMP LIGHTING CONTROL DEVICE ABLE TO COMMUNICATE WITH EACH FUNCTION?
N
Y
80
SIGNAL TRANSMISSION DURING LANE CHANGE BY ONE OF THE FUNCTIONS?
N
82
IS THE INFORMATION FROM THE SENSOR CONTROL DEVICE SATISFYING THE LANE CHANGE CONDITION?
Y
N
Y
84
LAMP LIGHTING CONTROL DEVICE TO CHANGE LANES?
N
Y
86
DOES THE LIGHT PATTERN PROTRUDE FROM THE LANE AT THE LANE CHANGE DESTINATION?
N
Y
PERFORM PARTIAL EXTINCTION OR DEFORMATION OF THE LIGHT PATTERN ACCORDING TO THE AMOUNT OF PROTRUSION OF THE LIGHT PATTERN FROM THE LANE AT THE LANE CHANGE DESTINATION
88
90
CONTINUE LANE CHANGE?
N
Y

LAMP CONTROL METHOD AND DEVICE FOR VEHICLE

CROSS-REFERENCE TO RELATED APPLICATION

This application claims priority to Japanese Patent Application No. 2024-007060 filed on Jan. 19, 2024, incorporated herein by reference in its entirety.

BACKGROUND

1. Technical Field

The present disclosure relates to a lamp control method for a vehicle and a lamp control device for a vehicle.

2. Description of Related Art

Japanese Unexamined Patent Application Publication No. 2021-79907 (JP 2021-79907 A) describes technology of projecting a course-of-travel display image indicating a course of travel of an own vehicle on a road surface around the own vehicle, at the time of the own vehicle making right and left turns (see FIGS. 4 and 5 of JP 2021-79907 A, and so forth).

SUMMARY

When the own vehicle is going to change lanes and a light pattern is projected from the own vehicle toward a lane to which lane changing is to be performed, the light pattern may be projected beyond the lane to which lane changing is to be performed, which might cause confusion to traffic participants that are present around the own vehicle.

The present disclosure has been made in consideration of the foregoing circumstances, and an object thereof is to provide a lamp control method for a vehicle and a lamp control device for a vehicle, which are capable of suppressing confusion of traffic participants present around the own vehicle when the own vehicle makes lane changes.

According to a first aspect, a lamp control method for a vehicle includes projecting, at a time of lane changing of an own vehicle, a light pattern from a lamp of the own vehicle in a direction extending from the own vehicle to a side of a lane to which lane changing is to be performed, and shortening a length of the light pattern at a timing at which the lane changing progresses, as compared to at a timing at which the lane changing starts.

In the first aspect, at the timing at which the lane changing of the own vehicle has progressed, the length of the light pattern projected in the direction extending from the own vehicle to the side of the lane to which lane changing is to be performed is made shorter than at the timing at which the lane changing of the own vehicle starts. Thus, the light pattern can be suppressed from being projected beyond the lane to which lane changing is to be performed, and thus confusion of traffic participants that are present in the surroundings of the own vehicle can be suppressed.

According to a second aspect, in the first aspect, the light pattern is a pattern in which two or more partial projection regions with a predetermined shape are arrayed in the direction extending from the own vehicle to the side of the lane to which lane changing is to be performed.

In the second aspect, the light pattern is a pattern in which the partial projection regions of two or more predetermined shapes are arranged in the direction extending from the own vehicle to the side of the lane to which lane changing is to be performed, so that the traffic participants that are present in the surroundings of the own vehicle can easily recognize the light pattern.

According to a third aspect, in the second aspect, the length of the light pattern is shortened by reducing the number of partial projection regions with the predetermined shape included in the light pattern.

In the third aspect, the length of the light pattern is shortened by reducing the number of partial projection regions with the predetermined shape included in the light pattern. This makes it easier for a traffic participant present in the surroundings of the own vehicle to recognize that the length of the light pattern is shortened.

According to a fourth aspect, in the first aspect, the length of the light pattern is shortened by reducing a size of the entire light pattern.

In the fourth aspect, the length of the light pattern is shortened by reducing the size of the entire light pattern. This makes it easier for a traffic participant present in the surroundings of the own vehicle to recognize that the length of the light pattern is shortened.

According to a fifth aspect, a lamp control device for a vehicle includes a control unit that projects, at a time of lane changing of an own vehicle, a light pattern from a lamp of the own vehicle in a direction extending from the own vehicle to a side of a lane to which lane changing is to be performed, and shortens a length of the light pattern at a timing at which the lane changing progresses, as compared to at a timing at which the lane changing starts.

According to the fifth aspect, similarly to the first aspect, when the own vehicle changes lanes, confusion of traffic participants that are present in the surroundings of the own vehicle can be suppressed.

The present disclosure has an effect that confusion of traffic participants that are present in the surroundings of the own vehicle can be suppressed when the own vehicle performs lane changing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a schematic diagram illustrating an exemplary configuration of a lamp unit;

FIG. 2B is a schematic diagram illustrating an exemplary configuration of a lamp unit;

FIG. 2C is a schematic diagram illustrating an exemplary configuration of a lamp unit;

FIG. 2D is a schematic diagram illustrating an exemplary configuration of a lamp unit;

FIG. 3 is a flowchart illustrating an example of a light pattern projection control process;

DETAILED DESCRIPTION OF EMBODIMENTS

Figure 1:
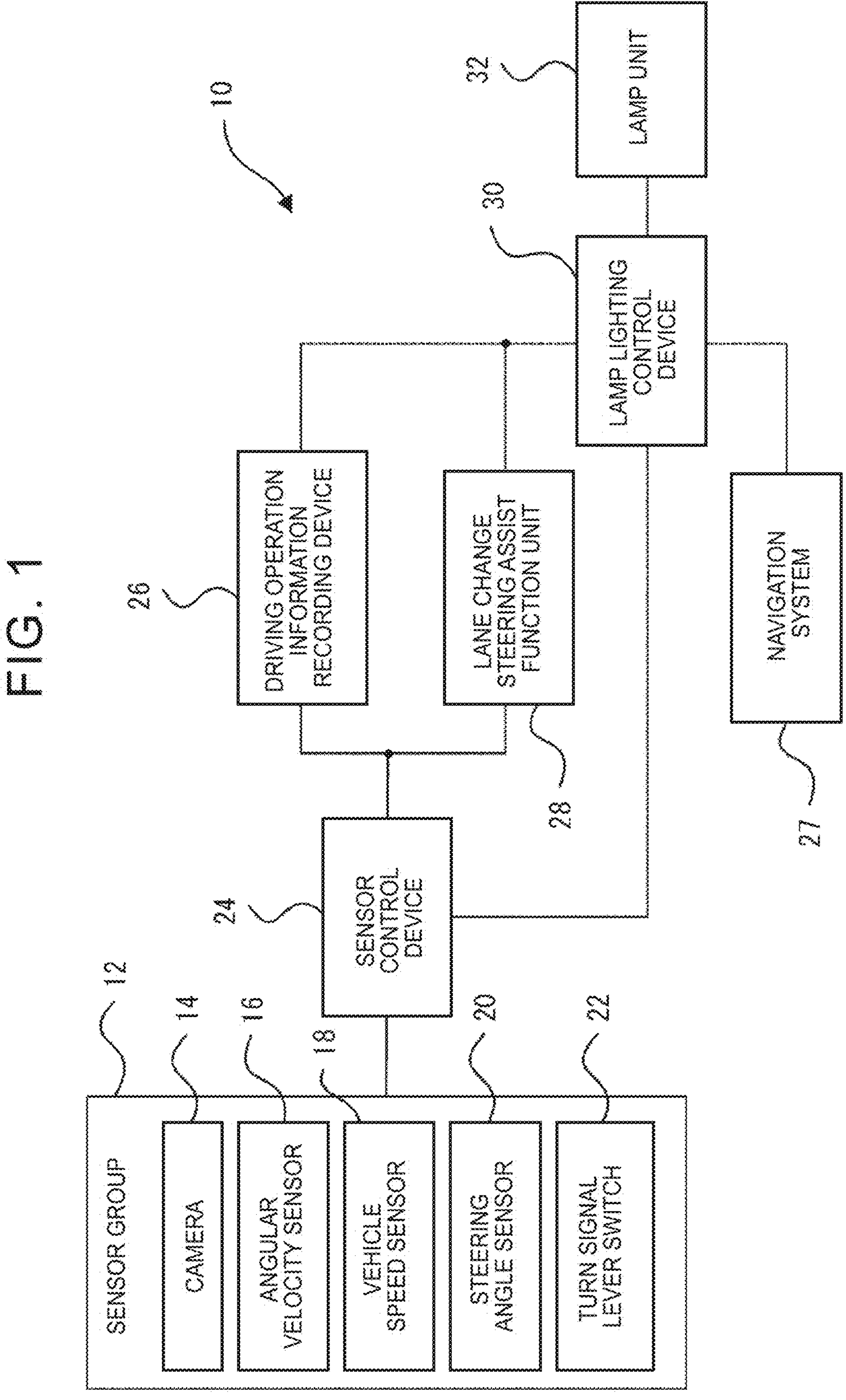
FIG. 1 is a block diagram illustrating a schematic configuration of a vehicle lamp device according to an embodiment.

Hereinafter, an example of an embodiment of the present disclosure will be described in detail with reference to the drawings. As illustrated in FIG. 1, the vehicle lamp device 10 according to the present embodiment includes a sensor group 12, a sensor control device 24, a driving operation information recording device 26, a navigation system 27, a lane change steering assist function unit 28, a lamp lighting control device 30, and a lamp unit 32. In the following description, the vehicle on which the vehicle lamp device 10 is mounted is referred to as an "own vehicle".

The sensor group 12 includes sensors such as a camera 14, an angular velocity sensor 16, a vehicle speed sensor 18, a steering angle sensor 20, and a turn signal lever switch 22. The camera 14 captures an image of the surroundings of the own vehicle, and outputs the captured result as image information. The angular velocity sensor 16 detects the angular velocity of the own vehicle and outputs angular velocity information. The vehicle speed sensor 18 detects the vehicle speed of the own vehicle and outputs vehicle speed information. The steering angle sensor 20 detects a steering angle of the own vehicle and outputs steering angle information. The turn signal lever switch 22 switches the contact position when the turn signal lever is turned on to the left or right by an occupant of the own vehicle when the vehicle turns left or right or when the course is changed to the left and right, and outputs the contact position information representing the contact position.

The sensor control device 24 supplies electric power to the sensors of the sensor group 12, receives information output from the sensors, and monitors the state of the own vehicle. The driving operation information recording device 26 records, as driving operation information, an operation of the turn signal lever by the occupant of the own vehicle. The navigation system 27 performs a process of displaying the position of the own vehicle on a map or determining and guiding a route to a destination on the basis of the position information of the own vehicle and the map information determined by the GNSS (Global Navigation Satellite System) sensor.

When the lane change steering assist function unit 28 satisfies the first lane change condition and determines that the surrounding situation detected by the sensor group 12 is a lane changeable situation, it cooperates with the sensor control device 24, the driving operation information recording device 26, and the navigation system 27 to perform automatic steering at the time of lane change of the own vehicle. The first lane change condition includes, for example, a case where the turn signal lever is turned on to the left or the right by an occupant of the own vehicle while the own vehicle is traveling by cruise control.

The lamp-lighting control device 30 includes memories such as CPU (Central Processing Unit), ROM (Read Only Memory), and RAM (Random Access Memory), and non-volatile storage units such as HDD (Hard Disk Drive) and SSD (Solid State Drive). A predetermined program for causing CPU of the lamp-lighting control device 30 to function as a control unit is stored in the storage unit. The control unit performs control to project the light pattern from the lamp unit 32 of the own vehicle in a direction extending from the own vehicle toward the lane of the lane change destination. In addition, the control unit performs control to make the length of the light pattern shorter than the start timing of the lane change at the timing at which the lane change progresses. The lamp lighting control device 30 is an example of a vehicle lamp control device according to the present disclosure.

On the other hand, the lamp unit 32 is an auxiliary light that emits light toward a road surface around the own vehicle and is capable of changing a light pattern irradiated on the road surface. In the present embodiment, the lamp unit 32 is provided at each of the left and right front end portions and the side portion of the vehicle. The individual lamp units 32 may be configured to include, for example, LED arrays 34 in which a plurality of LED tips 36 is arranged in a matrix, and the lenses 38 arranged on the light emission sides of LED arrays 34, as in the micro LED system shown in FIG. 2A. In this configuration (micro LED method), the light emitted from the individual LED chips 36 is arranged in a matrix on the road surface, and the light pattern irradiated on the road surface can be changed to any pattern by controlling the turning-off of the individual LED chips 36.

Next, referring to FIG. 3, an light pattern projecting control process executed by CPU of the lamp-lighting control device 30 while the ignition switch of the own vehicle is on will be described as an operation of the present embodiment. In step 70 of the light pattern projection control process, the lamp lighting control device 30 stops the projection of the light pattern from the lamp unit 32 to the road surface around the own vehicle.

In step 72, the lamp lighting control device 30 determines whether or not the light pattern projection function for projecting the light pattern from the lamp unit 32 onto the road surface around the own vehicle is set to "valid". The light pattern projection function is set to "valid" or "invalid" by, for example, operating a switch (not shown) by an occupant of the own vehicle. If the determination in step 72 is negative, the process returns to step 70, and if the determination in step 72 is affirmative, the process proceeds to step 74.

In step 74, the lamp lighting control device 30 acquires the contact position information output from the turn signal lever switch 22 via the sensor control device 24. The lamp lighting control device 30 determines whether or not the turn signal lever is turned on to the left or the right based on the acquired information. If the determination in step 74 is negative, the process returns to step 70, and if the determination in step 74 is affirmative, the process proceeds to step 76.

Figure 4:
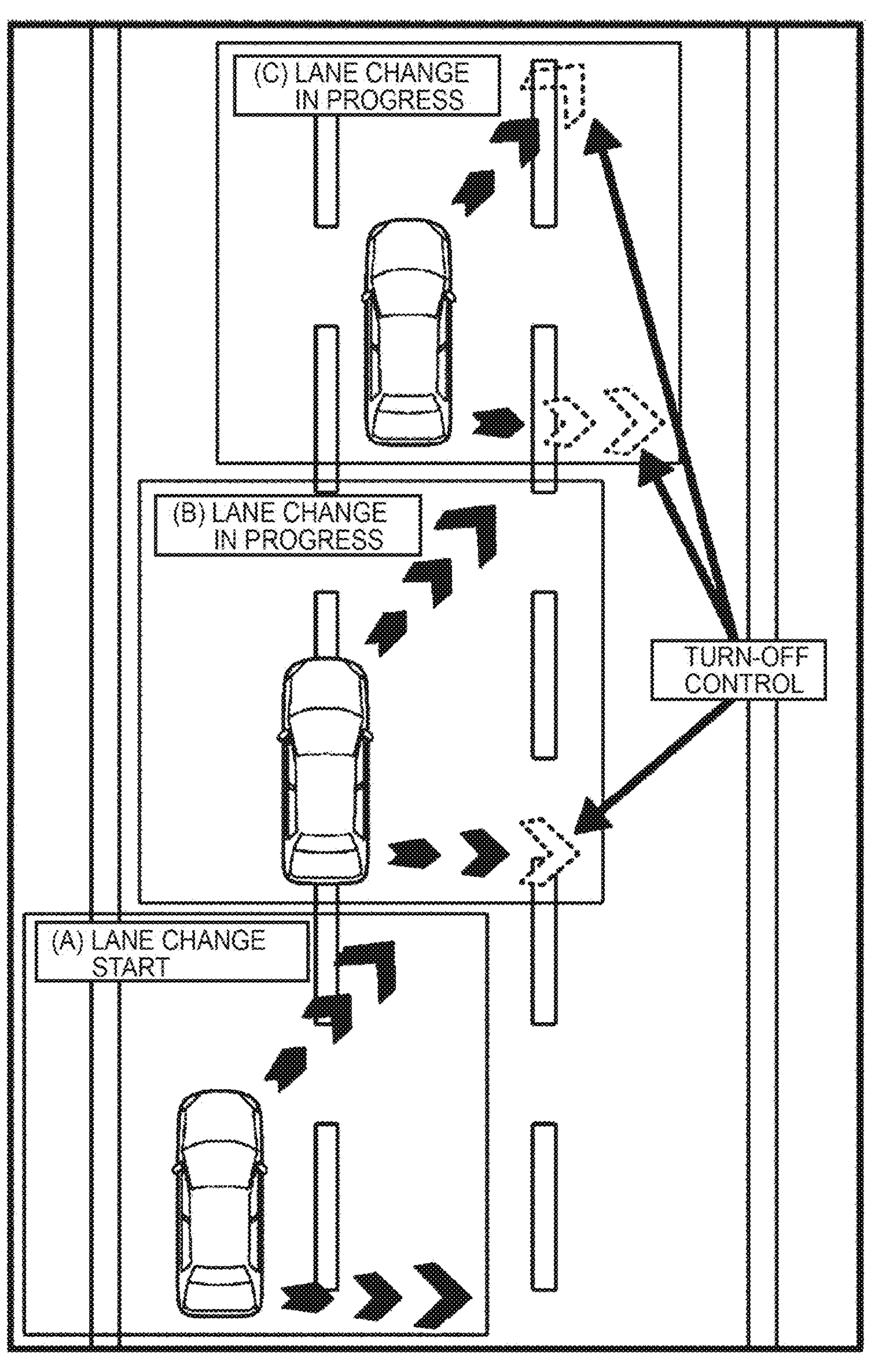
FIG. 4 is an explanatory view for explaining a mode in which a part of a light pattern is turned off according to an amount of protrusion of a light pattern from a lane of a lane change destination.

In step 76, the lamp lighting control device 30 causes the lamp unit 32 corresponding to the direction in which the turn signal lever is turned on to project the light pattern onto the road surface around the own vehicle by full lighting. As an example, (A) of FIG. 4 shows an example in which the turn signal lever is turned on to the right, and the light pattern is projected onto the surrounding road surface from the lamp unit 32 at the right front end portion and the right side portion of the corresponding own vehicle by full lighting. The light pattern illustrated in (A) of FIG. 4 is a pattern in which three partial projection regions of an inverted V shape, each of which is convex in a direction away from the own vehicle, are arranged in a direction extending from the own vehicle toward the lane of the lane change destination, and the width of the partial projection region increases as the distance from the own vehicle increases. As described above, by projecting the light pattern onto the road surface around the own vehicle, it is possible to cause the traffic participant existing around the own vehicle to recognize that the own vehicle is going to make a right-left turn or a left-right lane change. In the present embodiment, when the own vehicle turns right and left, the light pattern is maintained in an all-lamp state.

The number of partial projection regions constituting the light pattern may be other than three. Further, in the above step 76, when the light pattern is projected from the lamp unit 32 onto the road surface, it is not limited to maintaining the light pattern in the all-lit state. For example, the light pattern may be changed like an animation by switching the partial projection region to be turned on among the light patterns.

In the next step 78, the lamp lighting control device 30 determines whether each of the functional units of the sensor control device 24, the driving operation information recording device 26, the navigation system 27, and the lane change steering assist function unit 28 is able to communicate with each other. When an abnormality such as a communication failure has occurred, the determination in step 78 is negative, and the process returns to step 70, but in the normal case, the determination in step 78 is affirmative, and the process proceeds to step 80.

In step 80, the lamp lighting control device 30 determines whether or not any of the functional units of the sensor control device 24, the driving operation information recording device 26, the navigation system 27, and the lane change steering assist function unit 28 is transmitting a signal indicating that automatic steering at the time of lane change of the own vehicle is being executed. If the determination in step 80 is negative, the process proceeds to step 82, and if the determination in step 80 is affirmative, the process proceeds to step 84.

In step 82, the lamp lighting control device 30 determines whether the information from the sensor control device 24 satisfies the second lane change condition, that is, whether the lane change of the own vehicle is manually performed. If the determination in step 82 is negative, the process returns to step 70, and if the determination in step 82 is affirmative, the process proceeds to step 84. An example of the second lane change condition is a case where it is detected from the image captured by the camera 14 that the own vehicle is straddling the lane, the steering angle of the steering of the own vehicle is less than the predetermined angle threshold, and the angular velocity of the own vehicle is less than the predetermined angular velocity threshold. As the angular threshold, for example, ±15°, and as the angular velocity threshold, for example, 0.3 G can be applied.

The determination as to whether or not the lane change of the own vehicle is manually performed is not limited to the above. For example, it may be determined whether the lane change of the own vehicle is manually performed by collating the traveling state of the own vehicle that can be detected from the image captured by the camera 14 with the map information of the navigation system 27. Further, a point at which a lane change has been made in the past by the driver may be learned from an image captured by the camera 14 or the like, and it may be determined whether the lane change of the own vehicle is made when the current position of the own vehicle is a point at which the lane change has been made in the past by the driver.

In step 84, the lamp lighting control device 30 determines whether to control the light pattern associated with the lane change. If the determination in step 84 is negative, the process returns to step 70, and if the determination in step 84 is affirmative, the process proceeds to step 86.

In step 86, the lamp lighting control device 30 determines whether or not the projection range of the light pattern emitted from the lamp unit 32 on the road surface protrudes from the lane of the lane change destination based on, for example, an image captured by the camera 14. At the timing immediately after the start of the lane change, as illustrated in (A) of FIG. 4 and (A) of FIG. 5, the projection range of the light pattern emitted from the lamp unit 32 on the road surface falls within the lane of the lane change destination. Therefore, the determination in step 86 is negative, and the process returns to step 70.

On the other hand, at a timing when a certain amount of time has elapsed since the start of the lane change, as indicated by broken lines in (B) and (C) of FIG. 4, the projection range of the light pattern emitted from the lamp unit 32 on the road surface protrudes from the lane of the lane change destination. In this case, the determination in step 86 is affirmative, the process proceeds to step 88.

In step 88, the lamp lighting control device 30 detects the amount of protrusion of the projection range of the light pattern from the lane at the lane change destination, and executes a first control (light-off control) for turning off a part of the light pattern or a second control (reduction deformation control) for reducing and deforming the light pattern according to the detected protrusion amount. In the next step 90, the lamp lighting control device 30 determines whether or not the lane change continues. If the determination in step 90 is negative, the process returns to step 70, and if the determination in step 90 is affirmative, the process returns to step 86.

The above-described steps 86 to 90 are repeated at the time of lane change to the right lane, and an example of a control result in a case where the first control (turn-off control) is performed during this period is shown in (B) and (C) of FIG. 4. At the timing shown in (B) of FIG. 4, the own vehicle straddles the lane, and among the lamp units 32 provided at the right front end portion and the right side portion of the own vehicle, the projection range of the light pattern emitted from the lamp unit 32 at the right side portion of the own vehicle protrudes from the lane on the right side of the lane change destination. Therefore, in step 88, as indicated by a broken line in (B) of FIG. 4, a part of the partial projection region (one partial projection region having the largest distance from the own vehicle) in which the projection position protrudes from the right adjacent lane among the light patterns emitted from the lamp unit 32 is turned off with respect to the lamp unit 32 on the right side of the own vehicle.

Further, at the timing shown in (C) of FIG. 4, the lane change progresses further than the timing shown in (B) of FIG. 4, and the own vehicle moves into the lane on the right of the lane change destination. At this timing, the projection range of the light pattern emitted from the right front end portion and the right side lamp unit 32 of the own vehicle protrudes from the right adjacent lane of the lane change destination. Therefore, in step 88, as indicated by a broken line in (C) of FIG. 4, a part of the partial projection region in which the projection position protrudes from the right adjacent lane among the light patterns emitted from the lamp units 32 is turned off with respect to the lamp units 32 at the right front end portion and the right side portion of the own vehicle. That is, in the light pattern emitted from the lamp unit 32 at the right side portion of the own vehicle, the partial projection region where the projection position protrudes from the right adjacent lane (the two partial projection regions in descending order of the distance from the own vehicle) is turned off. Further, in the light pattern emitted from the lamp unit 32 at the right front end portion of the own vehicle, a partial projection region (one partial projection region having the largest distance from the own vehicle)

in which the projection position protrudes from the right adjacent lane is turned off. As a result, it is possible to prevent the traffic participants existing around the own vehicle from being confused.

Figure 5:
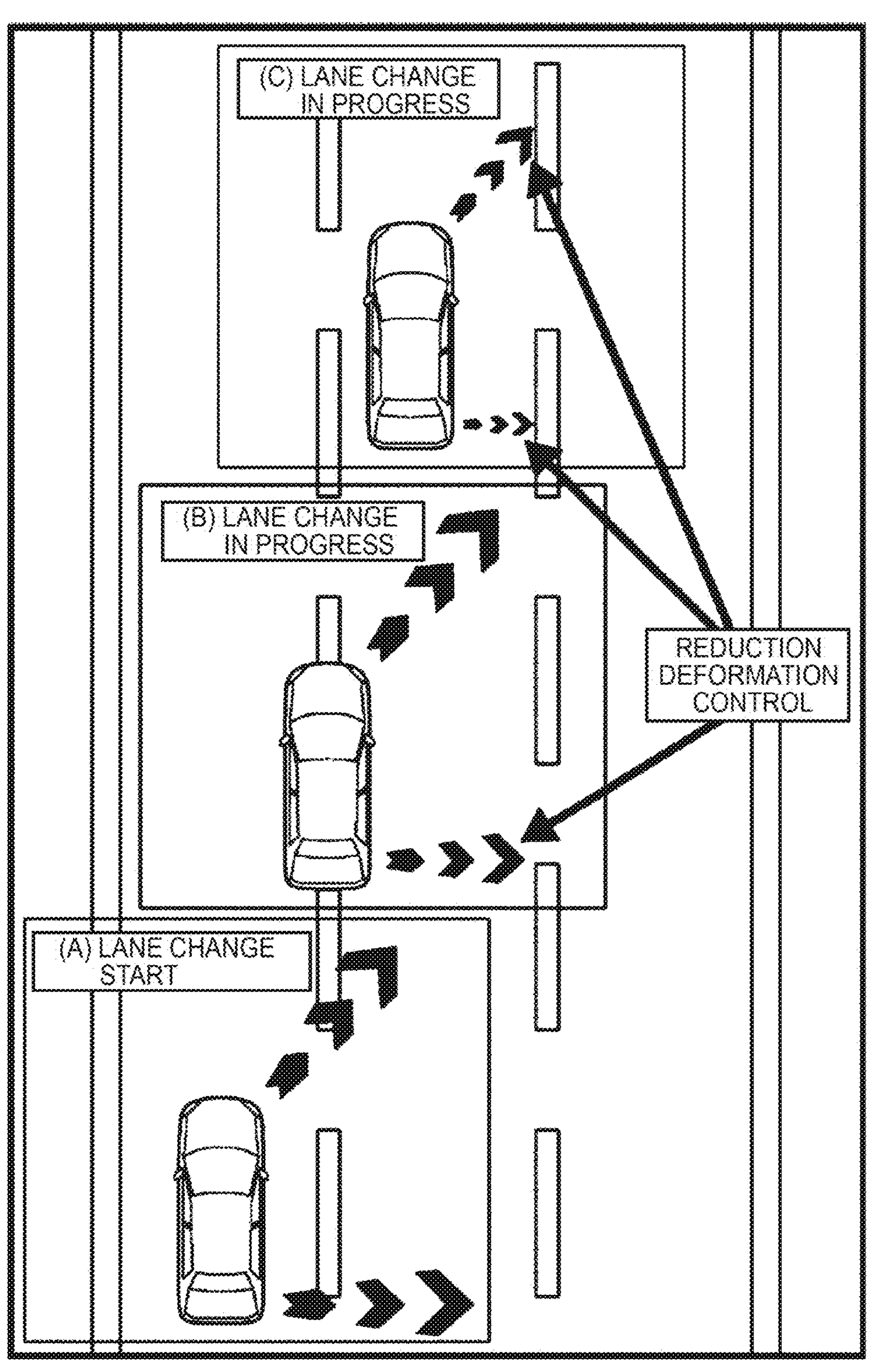
FIG. 5 is an explanatory view for explaining an aspect of reducing and deforming the entire light pattern according to the amount of protrusion of the light pattern from the lane of the lane change destination.

Further, the above-described steps 86 to 90 are repeated at the time of lane change to the right lane, and an example of a control result in a case where the second control (reduction deformation control) is performed during this period is shown in (B) and (C) of FIG. 5. At the timing shown in (B) of FIG. 5, the own vehicle straddles the lane, and the projection range of the light pattern emitted from the lamp unit 32 on the right side of the own vehicle protrudes from the lane on the right side of the lane change destination (see also (B) of FIG. 4). Therefore, in step 88, as indicated by a broken line in (B) of FIG. 4, the light pattern is reduced and deformed so that the projection range of the light pattern emitted from the lamp unit 32 does not protrude from the right adjacent lane (so that none of the three partial projection regions constituting the light pattern protrudes from the right adjacent lane) with respect to the lamp unit 32 on the right side of the own vehicle.

Further, at the timing shown in (C) of FIG. 5, the lane change progresses further than the timing shown in (B) of FIG. 5, and the own vehicle moves into the lane on the right of the lane change destination. Then, at this timing, if the second control is not performed, the projection range of the light pattern emitted from the lamp unit 32 at the right front end portion and the right side portion of the own vehicle protrudes from the right adjacent lane of the lane change destination (see also (C) of FIG. 4). Therefore, in step 88, as shown in (C) of FIG. 5, the light pattern is reduced and deformed at a reduction rate larger than the timing shown in (B) of FIG. 5 so that the projection range of the light pattern emitted from the lamp unit 32 does not protrude from the right adjacent lane with respect to the lamp unit 32 at the right front end portion and the right side portion of the own vehicle. In this case as well, it is suppressed that confusion is given to the traffic participants existing around the own vehicle. Note that the reduction ratio in the case of reducing and deforming the light pattern may be the same as or different from the direction in which the light pattern extends (the arrangement direction of the partial projection region) and the direction intersecting therewith (the width direction of the partial projection region).

When the lane change to the lane of the lane change destination is completed through the above-described control, the determination in step 90 is affirmative, and the processing returns to step 70, and the projection of the light pattern is ended.

As described above, in the present embodiment, when the lane of the own vehicle is changed, the light pattern is projected from the lamp unit 32 of the own vehicle in a direction extending from the own vehicle toward the lane of the lane change destination, and the length of the light pattern is made shorter than the start timing of the lane change at the timing when the lane change progresses. As a result, it is possible to suppress the light pattern from being projected beyond the lane of the lane change destination, and to prevent confusion to traffic participants existing around the own vehicle.

Further, in the present embodiment, the light pattern is a pattern in which two or more partial projection regions having a predetermined shape are arranged in a direction extending from the own vehicle toward the lane of the lane change destination. As a result, the traffic participants present around the own vehicle can easily recognize the light pattern.

In addition, in the first control of the present embodiment, the length of the light pattern is shortened by reducing the number of partial projection regions of a predetermined shape included in the light pattern. This makes it easier for a traffic participant present in the surroundings of the own vehicle to recognize that the length of the light pattern is shortened.

Further, in the second control in the present embodiment, the length of the light pattern is shortened by reducing the size of the entire light pattern. This makes it easier for a traffic participant present in the surroundings of the own vehicle to recognize that the length of the light pattern is shortened.

In the above-described embodiment, the lamp unit 32 is provided at each of the left and right front end portions and the side portion of the own vehicle, but the number and the installation position of the lamp unit 32 are not limited thereto. For example, the lamp unit 32 may be provided only at the left and right front end portions of the own vehicle, or may be provided only at the left and right side portions of the own vehicle.

Further, in the above embodiment, the light pattern is a pattern in which two or more partial projection regions having a predetermined shape are arranged in a direction extending from the own vehicle toward the lane of the lane change destination, but the present disclosure is not limited to this. In particular, in a mode in which the second control (reduction deformation control) is performed, the light pattern may be a pattern composed of a single projection region (an arrow-shaped region as an example).

Further, in the above-described embodiment, the micro LED system shown in FIG. 2A has been described as the configuration of the lamp unit 32 capable of changing the light pattern irradiated on the road surface, but the present disclosure is not limited to the micro LED system.

For example, in DMD (Digital Mirror Device) method in FIG. 2B, DMD42 and the lenses 38 are arranged in this order on the light-emitting side of LED light source 40. DMD42 is arranged in a matrix with a plurality of micromirrors 44 that are variable in angle, and the individual micromirrors 44 are controlled to a first angle that reflects incident light into the lens 38, or a second angle that reflects incident light out of the lens 38. When DMD system is adopted as the lamp unit 32, the light reflected by the individual micromirrors 44 is arranged in a matrix on the road surface while the individual micromirrors 44 of DMD42 are controlled to the first angle. Therefore, by controlling the angle of the individual micromirrors 44 to the first angle or the second angle, the light pattern irradiated on the road surface can be changed to an arbitrary pattern.

Further, for example, in the laser scanning method of FIG. 2C, MEMS (Micro Electro-Mechanical System) mirror 48, the phosphor 50, and the lenses 38 are arranged in this order on the light emitting side of the blue laser light source 46. In MEMS mirror 48, the angle of the mirror is controlled so that the laser beam entering the mirror is scanned two-dimensionally. The phosphor 50 performs wavelength conversion of the incident scanning laser light. When the laser scanning method is employed as the lamp unit 32, the laser beam reflected by MEMS mirror 48 and passed through the phosphor 50 and the lenses 38 in this order is scanned two-dimensionally on the road surface. Therefore, the light pattern irradiated on the road surface can be changed to an arbitrary pattern by controlling the turning-off of the blue laser light source 46 at a timing at which the laser beam scans each position on the road surface.

Further, for example, in the liquid crystal system shown in FIG. 2D, the liquid crystal panel 56 and the lenses 38 having a configuration in which the front and back surfaces of the liquid crystal layer 52 are sandwiched between a pair of polarizing plates 54 are arranged in this order on the light emitting sides of LED arrays 34 in which the plurality of LED chips 36 are arranged in a matrix. When a liquid crystal system is adopted as the lamp unit 32, the light transmitted through the individual liquid crystal cells of the liquid crystal panel 56 is arranged in a matrix on the road surface. Therefore, by controlling the light transmittance of each liquid crystal cell of the liquid crystal panel 56, the light pattern irradiated on the road surface can be changed to an arbitrary pattern.

What is claimed is:

1. A lamp control method for a vehicle, the lamp control method comprising:

projecting, at a time of lane changing of the vehicle that is made by a driver, a light pattern from a lamp of the vehicle onto a road surface in a direction extending from the vehicle to a side of a lane to which the lane changing is to be performed;

determining, based on information from a sensor of the vehicle, whether the light pattern protrudes from the lane to which the lane changing is to be performed;

calculating an amount of protrusion of the light pattern in response to the determination that the light pattern protrudes from the lane to which the lane changing is to be performed; and shortening a length of the light pattern by reducing the number of partial projection regions with a predetermined shape included in the light pattern or by reducing a size of the entire light pattern, according to the calculated amount of protrusion, at a timing at which the lane changing progresses, as compared to at a timing at which the lane changing starts.

2. The lamp control method according to claim 1, wherein the light pattern is a pattern in which two or more partial projection regions with the predetermined shape are arrayed in the direction extending from the vehicle to the side of the lane to which the lane changing is to be performed.

3. The lamp control method according to claim 1, wherein the shortening of the length of the light pattern includes turning off the partial projection regions in descending order based on their distance from the vehicle, starting with the partial projection region farthest from the vehicle.

4. The lamp control method according to claim 1, wherein the sensor of the vehicle includes a camera, and the amount of protrusion is calculated based on image data captured by the camera.

* * * * *